May 8, 1923. 1,454,099

A. E. ZIERICK

AUTOMOBILE LOCK

Filed May 3, 1922

INVENTOR
Ambrose E. Zierick
BY
George Cook & Sons
ATTORNEYS

Patented May 8, 1923.

1,454,099

UNITED STATES PATENT OFFICE.

AMBROSE E. ZIERICK, OF NEW YORK, N. Y.

AUTOMOBILE LOCK.

Application filed May 3, 1922. Serial No. 558,097.

*To all whom it may concern:*

Be it known that I, AMBROSE E. ZIERICK, a citizen of the United States, and a resident of New York, borough of Manhattan, in the county of New York and State of New York, have made and invented certain new and useful Improvements in Automobile Locks, of which the following is a specification.

My invention relates to a lock for automobiles and particularly to an apparatus for locking the steering wheel against turning and thus prevent the automobile from being driven.

An object of the present invention is to provide a steering wheel lock which is particularly adapted for that type of steering gear which employs a set of planetary gears between the steering wheel proper and the shaft which extends to and operates the steering mechanism proper, such as used in the Ford automobile.

A further object is to provide a steering wheel lock which is adapted to engage and hold the planetary wheels and gears against movement with respect to the steering post and by such arrangement providing that the apparatus will be simple in construction, economical to manufacture and efficient and trustworthy in its action and thus afford a protection against the malicious driving or theft of the car.

A further object is to provide a steering wheel lock which may be attached to the steering post of the automobile and secured in place without in any way requiring the construction of the steering wheel, post or steering shaft to be changed or altered or any machine work to be performed thereon, thus allowing the device to be installed with but little labor and thus at a minimum cost, and with the foregoing and other objects in view, my invention consists in the improved automobile lock illustrated in the accompanying drawing and hereinafter described and claimed, and in such variations and modifications thereof as will be obvious to those skilled in the art to which my invention relates, it being understood that changes may be made within the scope of what is claimed without departing from the spirit thereof.

The preferred embodiment of my invention is disclosed in the accompanying drawing, wherein.

Figure 1:
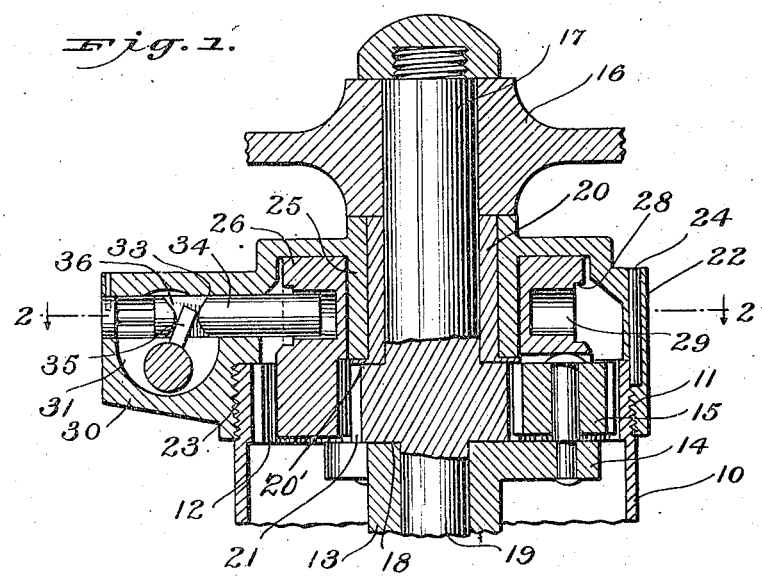
Figure 1 is a view in vertical section of the top of the steering post and illustrating portions of the steering wheel and steering shaft, the latter having the planetary gears thereon and showing my novel lock attached thereto and in locked position.
Figure 2:
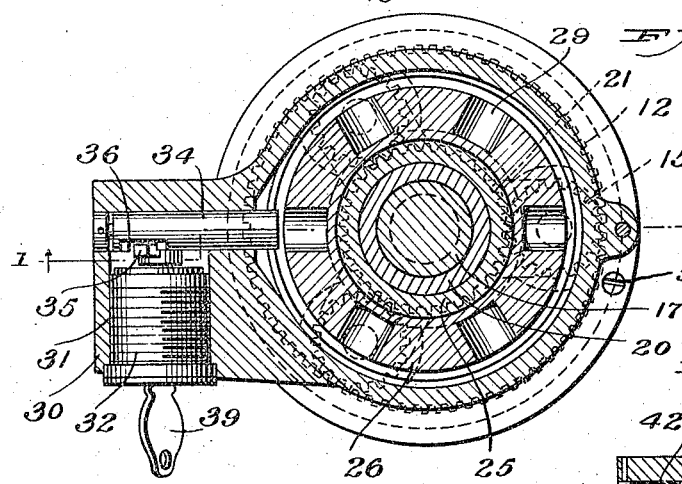
Figure 2 is a view in horizontal section taken on the line 2—2 of Figure 1.

Referring specifically to the several views wherein similar reference numerals designate corresponding parts throughout, the steering post 10 is of the usual type and firmly secured to the floor boards of the car (not shown) and is provided with the upper threaded extremity 11, directly behind which and formed integrally with the post is the internal gear 12. Extending up through the stationary steering post 10 is the steering shaft 13 which is provided at its upper extremity with the three outstanding arms 14 carrying the planetary gears 15 thereon which mesh with the internal gear 12. The steering wheel 16 is provided with the downwardly extending rod 17 which is provided adjacent its lower extremity with the shoulder 18 and the reduced end 19, the latter fitting within the steering shaft 13 and effecting a rotatable joint therewith. The steering rod 17 is provided with a bushing 20, the lower end of which is flanged as at 20'. That portion of the steering rod 17 which is located directly above the reduced end 19 is formed as a pinion 21 and meshes with the planetary gears 15. Thus as the steering wheel 16 is turned the motion is transmitted to the steering rod 17 and to the pinion 21 which is formed integral therewith. The turning of the pinion 21 tends to rotate the planetary gears 15 and thus cause them to revolve, due to their meshing with the internal gear 12.

Figure 3:
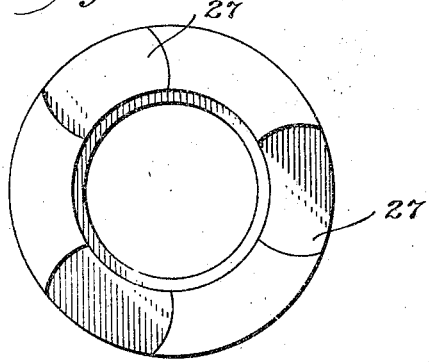
Figure 3 is a plan view of the member which engages the planetary gears and holds the same from moving and thus prevents the turning of the steering wheel.

My novel lock comprises a housing or casing 22 which is threaded at its lower extremity as at 23 and which engages the upper threaded extremity 11 of the steering post 10 and after having been tightly screwed thereon is permanently locked thereto by the pin 24, the same engaging approximately half of the casing and half of the upper extremity of the steering post so as to prevent the relative turning of the two. Located within the housing is the journal or stud 25 and upon which is located the rotating cage or gear holding member 26. This cage or gear holding member is illustrated in bottom plan in Figure 3 and includes the cut-out portions 27 which are adapted to receive the planetary gears 15 therein and thus allow the planetary gears to revolve when the said cage or gear holding member is free to turn.

The cage or gear holding member is provided adjacent its upper extremity with the circular groove 28 extending therearound and leading in from which are the radial openings 29, preferably six in number, although I do not necessarily limit myself to the exact number of these radial openings. Extending outwardly from one side of the housing or casing 22 is the lock receiving projection 30 having the opening 31 extending therein and into which fits the cylinder lock 32. Intersecting the laterally extending opening 31 is the second and radially extending opening 33 and in which fits the plunger 34. The plunger 34 is arranged so as to align with the openings 29 as they pass therein front, so that when the plunger is inserted or moved into one of the radial openings 29 it will accordingly lock and hold the cage or gear holding member 26 against rotation with respect to the housing or casing 22 and thus in turn lock the pinion gears against movement with respect to the steering post 10 and thus prevent the steering gear of the car from functioning.

The cylinder key lock 32 is of the conventional form and is provided at its rear extremity with the swinging stem 35 which is adapted to engage the cam-shape recesses 36 in the face of the plunger bolt 34, so that as the key 39 is turned, causing the turning of the swinging stem 35, it moves the plunger 34 forward and into one of the openings 29 which may be in alignment therewith, the steering wheel being slowly turned as the key 39 is turned until the plunger bolt snaps into place.

Figure 4:
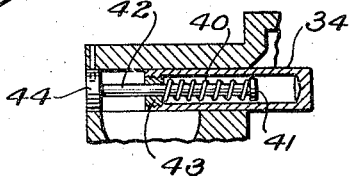
Figure 4 is a detail view in section of the locking bolt.

The plunger bolt 34 is preferably hollow as shown in Figure 4 and is provided with a spring 40 therein which acts upon the extremity 41 of the rod 42 and also upon a base plug 43 in the rear of the plunger bolt 34. The compression spring 40 accordingly tends to resiliently retract the plunger bolt 34 due to the end of the rod 42 being secured to the plug 44, which in turn is secured to the end wall of the outstanding projection 30.

This type of resiliently retracted plunger is for use in connection with that type of cylinder key lock wherein the key may be withdrawn from the lock when the swinging stem is in one position; that is, the lock has only one pin chamber, similar to the Yale and Eagle locks. The cylinder key lock is so arranged that the key may only be withdrawn when the swinging stem and the plunger bolt are thrust forwardly and adapted to hold the steering wheel against turning. As soon as the key is inserted in the lock, the compression spring retracts the plunger bolt and thus aids in unlocking the steering wheel.

Figure 5:
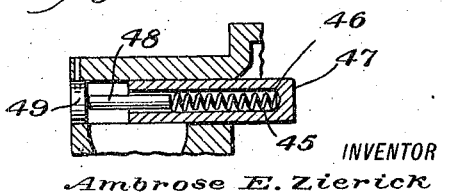
Figure 5 is a detail view in vertical section of a modified form of locking bolt.

Some of the conventional types of cylinder key locks, such as the Sargent, have two pin chambers, so that the key may be withdrawn when the swinging stem is in either of the two positions, and for use in connection with this form of lock I prefer to arrange the plunger bolt and spring as illustrated in Figure 5, wherein a compression spring 45 bears against the front wall of the opening 46 within the plunger bolt 47 and impinges at its rear extremity against the rod 48, which bears against or is connected to, the plug or rear wall 49 of the key lock housing or projection 30. Thus the modified form illustrated in Figure 5 results in the plunger 47 tending to assume a forward position. With this particular type, when it is desired to unlock the steering wheel, the key is inserted in place and the swinging bolt forcibly turned, causing the withdrawal of the plunger 47 against the action of the spring 45, and which retraction of the plunger bolt releases the planetary gears and allows the steering wheel to turn and function. The key may be withdrawn while the plunger is retracted and the steering wheel accordingly maintained in unlocked condition. When it is desired to again lock the steering wheel, the key is inserted in place, releasing the swinging stem and allowing the plunger bolt to move forwardly and engage one of the radial openings 29. The key may then be withdrawn and the steering wheel will accordingly remain in locked condition. The plunger bolt 34 is of such length and so arranged as to allow it to be withdrawn from the radial openings 29 but will never pass entirely out of the annular groove 28 and thus will always hold the cage or gear holding member 26 upon the stud or journal 25, thus causing the various parts to maintain their proper position while my improved lock is being sold and before being attached to the steering gear. In order that the various gears and bearings may be maintained in proper lubricated condition, I have provided a suitable oil hole 50, normally closed by a screw or closing cap.

From the foregoing it will be apparent that in my improved steering wheel lock I do not in any way have to alter or change the construction of the various parts of the steering wheel or gear, that the entire construction is simple in its arrangement and may accordingly be economically manufactured, and, further, due to the manner in which it engages the planetary wheels and holds them against rotation with respect to the steering post, forms a most strong and rigid lock and capable of preventing the malicious driving or theft of the car to which it is attached.

Having thus described and explained my invention, I claim and desire to secure by Letters Patent:

1. A steering gear lock comprising a housing, means for securing it to the upper extremity of a steering post, a sleeve-like journal carried by said housing, a cage or gear holding member rotatably mounted upon said sleeve-like journal and having portions protruding down between the planetary gears of the steering shaft, said sleeve-like journal rotatably receiving the steering shaft therethrough, a key lock carried by said housing, a plunger bolt actuated by said key lock, said cage or gear holding member provided with inwardly extending openings adapted to receive said plunger bolt therein and be held against movement thereby, and resilient means facilitating the movements of said plunger.

2. A steering gear lock comprising a housing, means for securing it to the upper extremity of a steering post, a sleeve-like journal carried by said housing, a cage or gear holding member rotatably mounted upon said sleeve-like journal and having portions protruding down between the planetary gears of the steering shaft, said sleeve-like journal rotatably receiving the steering shaft therethrough, a key lock carried by said housing, a plunger bolt actuated by said key lock, said cage or gear holding member provided with inwardly extending openings adapted to receive said plunger bolt therein and be held against movement thereby, and resilient means holding said plunger in a retracted position.

Signed at New York, borough of Manhattan, in the county of New York and State of New York, this 22nd day of April, A. D. 1922.

AMBROSE E. ZIERICK.

Witnesses:
DAVID BRUHWER,
JAS. A. SMITH.